(12) United States Patent
Cheng

(10) Patent No.: US 6,379,276 B1
(45) Date of Patent: Apr. 30, 2002

(54) BI-POWER TRANSMISSION MECHANISM

(76) Inventor: Keng Mu Cheng, 12F-1, No. 83, Hoping East Road, Sec. 1, Taipei (TW)

( * ) Notice: Subject to any disclaimer, the term of this patent is extended or adjusted under 35 U.S.C. 154(b) by 0 days.

(21) Appl. No.: 09/589,808

(22) Filed: Jun. 9, 2000

(51) Int. Cl.[7] ................................................. F16H 3/72
(52) U.S. Cl. .................. 475/4; 475/5; 475/7; 475/330; 475/337
(58) Field of Search ........................... 475/4, 5, 7, 330, 475/337, 343

(56) References Cited

U.S. PATENT DOCUMENTS

| | | | |
|---|---|---|---|
| 2,621,544 A | * 12/1952 | Rossmann | 475/4 |
| 4,261,224 A | * 4/1981 | Sulzer | 475/4 |
| 4,365,525 A | * 12/1982 | Imazaike | 475/337 |
| 4,754,949 A | * 7/1988 | Fukamachi | 475/4 |
| 4,994,001 A | * 2/1991 | Wilkinson et al. | 475/4 |
| 5,259,823 A | * 11/1993 | Coronel | 475/330 |

* cited by examiner

Primary Examiner—Sherry Estremsky
(74) Attorney, Agent, or Firm—Bacon & Thomas, PLLC

(57) ABSTRACT

A bi-power transmission mechanism. The transmission mechanism includes a first power unit, a second power unit, and a planetary gear train. The first power unit includes a motor, an input shaft, a worm, and a worm gear driven by the motor through the worm to rotate the input shaft. The planetary gear train includes a center gear synchronously rotated with the input shaft of the first power unit, a rack, planet gears equiangularly supported on the rack and meshed with the center gear, and an output shaft fixedly mounted on the rack for synchronous rotation with the rack and the input shaft of the first power unit. The second power unit is operated to rotate the planet gears through an internal gear via a worm and a worm gear so as to further rotate the output shaft of the planetary gear train when the first power unit fails to function well.

5 Claims, 5 Drawing Sheets

BI-POWER TRANSMISSION MECHANISM

BACKGROUND OF THE INVENTION

The present invention relates a transmission mechanism, and more particularly to a bi-power transmission mechanism practical for use in any of a variety of blinds, precision machinery and instruments, which comprises two power inputs and one power output.

Conventional Venetian blinds include two types, namely, the horizontal type and the vertical type. A regular horizontal blind uses a transmission rod to tilt slats horizontally. A regular vertical blind uses a transmission rod to tilt slats vertically. In a roller blind, a transmission rod is driven to take up or let off blind cloth. The transmission rod of a blind may be driven manually, or by a power unit. A manually operated blind must be operated by hand. It is inconvenient to some people, for example, patients or disabled persons to operate a manually operated blind. A power-driven blind can easily be operated. However, a power-driven blind cannot work when its circuit or the electric power fails. Therefore, there is a strong demand for a bi-power transmission mechanism that enables a blind to be optionally operated by electricity or the hand.

SUMMARY OF THE INVENTION

The present invention has been accomplished under the circumstances in view. It is the main object of the present invention to provide a bi-power transmission mechanism, which is practical for use in blinds, mechanical arms, small machines, and etc. that can be optionally operated by electricity, or the hand. It is another object of the present invention to provide a bi-power transmission mechanism, which is practical for use in a precision machine or instrument that needs to regulate the speed automatically, or requires feedback compensation. According to one aspect of the present invention, the bi-power transmission mechanism comprises a first power unit, a second power unit, and a planetary gear train. The first power unit comprises a motor, an input shaft, a worm, and a worm gear driven by the motor through the worm to rotate the input shaft. The planetary gear train comprises a center gear synchronously rotated with the input shaft of the first power unit, a rack, a plurality planet gears equiangularly supported on the rack and meshed with the center gear, and an output shaft fixedly mounted on the rack for synchronous rotation with the rack and the input shaft of the first power unit. The second power unit is operated to rotate the planet gears through an internal gear via a worm and a worm gear so as to further rotate the output shaft of the planetary gear train when the first power unit fails to function well. In one embodiment of the present invention, the second power unit is operated by electricity. In another embodiment of the present invention, the second power unit is manually operated.

DETAILED DESCRIPTION OF THE PREFERRED EMBODIMENT

Figure 1:
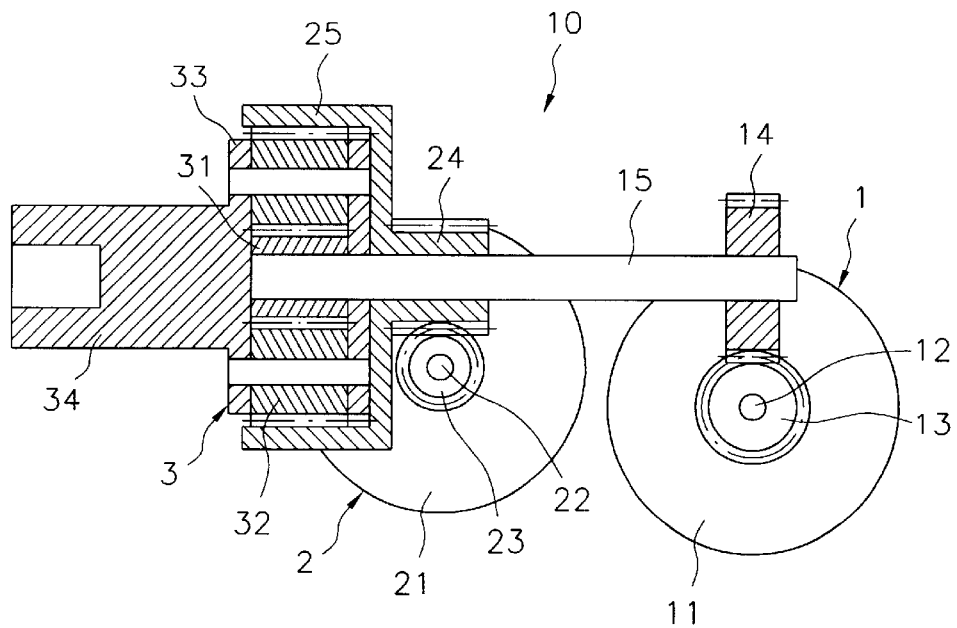
FIG. 1 illustrates a bi-power transmission mechanism according to one embodiment of the present invention.

Referring to FIG. 1, a bi-power transmission mechanism 10 in accordance with the present invention comprises a first power unit 1, a second power unit 2, and a planetary gear train 3. The first power unit 1 comprises a motor 11, a worm 13 fixedly fastened to the output shaft 12 of the motor 11, an input shaft 15, and a worm gear 14 fixedly mounted on the input shaft 15 and meshed with the worm 13. Rotary output power of the motor 11 is transmitted through the worm 13 and the worm gear 14 to the input shaft 15, causing the input shaft 15 to rotate the planetary gear train 3.

Referring to FIG. 1 again, the second power unit 2 comprises a motor 21, a worm 23 fixedly mounted on the output shaft 22 of the motor 21, a worm gear 24 supported on the input shaft 15 of the first power unit 1 and meshed with the worm 23 (the input shaft 15 is inserted through a center through hole on the worm gear 24 for enabling the worm gear 24 to be rotated on the input shaft 15), and an internal gear 25 fixedly fastened to the worm gear 24 at one side. Rotary output power of the motor 21 of the second power unit 2 is transmitted through the worm 23 and the worm gear 24 to the internal gear 25.

Referring to FIG. 1 again the planetary gear train 3 comprises a center gear 31 fixedly fastened to one end of the input shaft 15 of the first power unit 1 for synchronous rotation with the input shaft 15, a rack 33, a plurality of, for example, three planet gears 32 equiangularly mounted on a rack 33 and meshed with the center gear 31, and an output shaft 34 mounted on the rack 33 for output of rotary power.

Figure 2:
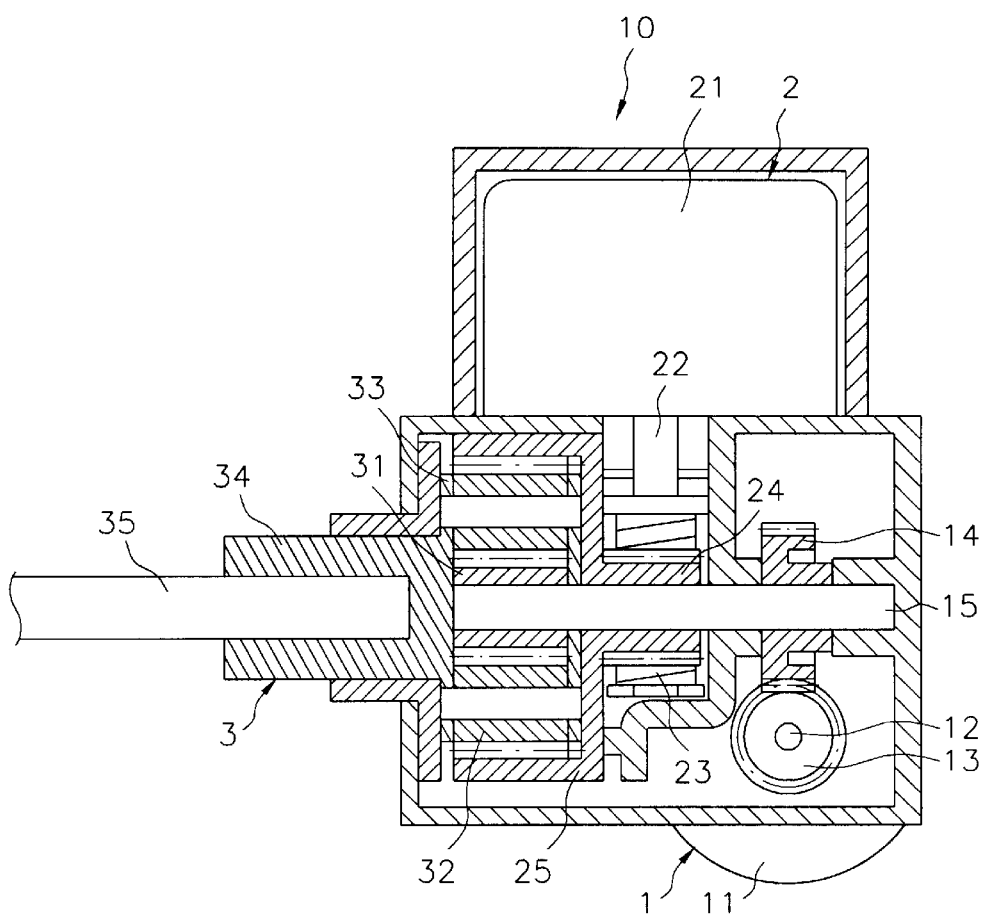
FIG. 2 is an applied view in section of the present invention, showing the bi-power transmission mechanism used in a mechanical arm.

FIG. 2 shows the bi-power transmission mechanism used in a precision mechanical arm. When starting the motor 11 of the first power unit 1 to turn the worm 13 of the first power unit 1, rotary driving power is transmitted through the worm gear 14 and input shaft 15 of the first power unit 1 to the center gear 31. At this time the second power unit 2 does no work, the worm gear 24 and internal gear 25 of the second power unit 2 are locked, and therefore the planet gears 32 are driven by the center gear 31 to rotate on their own axis and to move along the internal gear 25. During moving of the planet gears 32 along the internal gear 25, the rack 33 and the output shaft 34 are rotated at a low speed to provide a high torque, and the transmission shaft 35, which is coupled to the output shaft 34, is driven to move the mechanical arm (not shown). When increasing (or reducing) the revolving speed, the motor 21 of the second power unit 2 is started to turn the worm gear 24 and the internal gear 25, causing the planet gears 32 to be synchronously rotated. If the internal gear 25 and the planet gears 32 are moved in same direction, the output revolving speed is the difference between the speed of the internal gear 25 and the speed of the planetary gears 32. On the contrary, if the internal gear 25 and the planet gears 32 are moved in reversed directions, the output revolving speed is the sum of the speed of the internal gear 25 and the speed of the planet gears 32. In actual practice, the second power unit 2 is used to compensate and correct the error of the first power unit 1, so as to achieve high precision power transmission.

Figure 3:
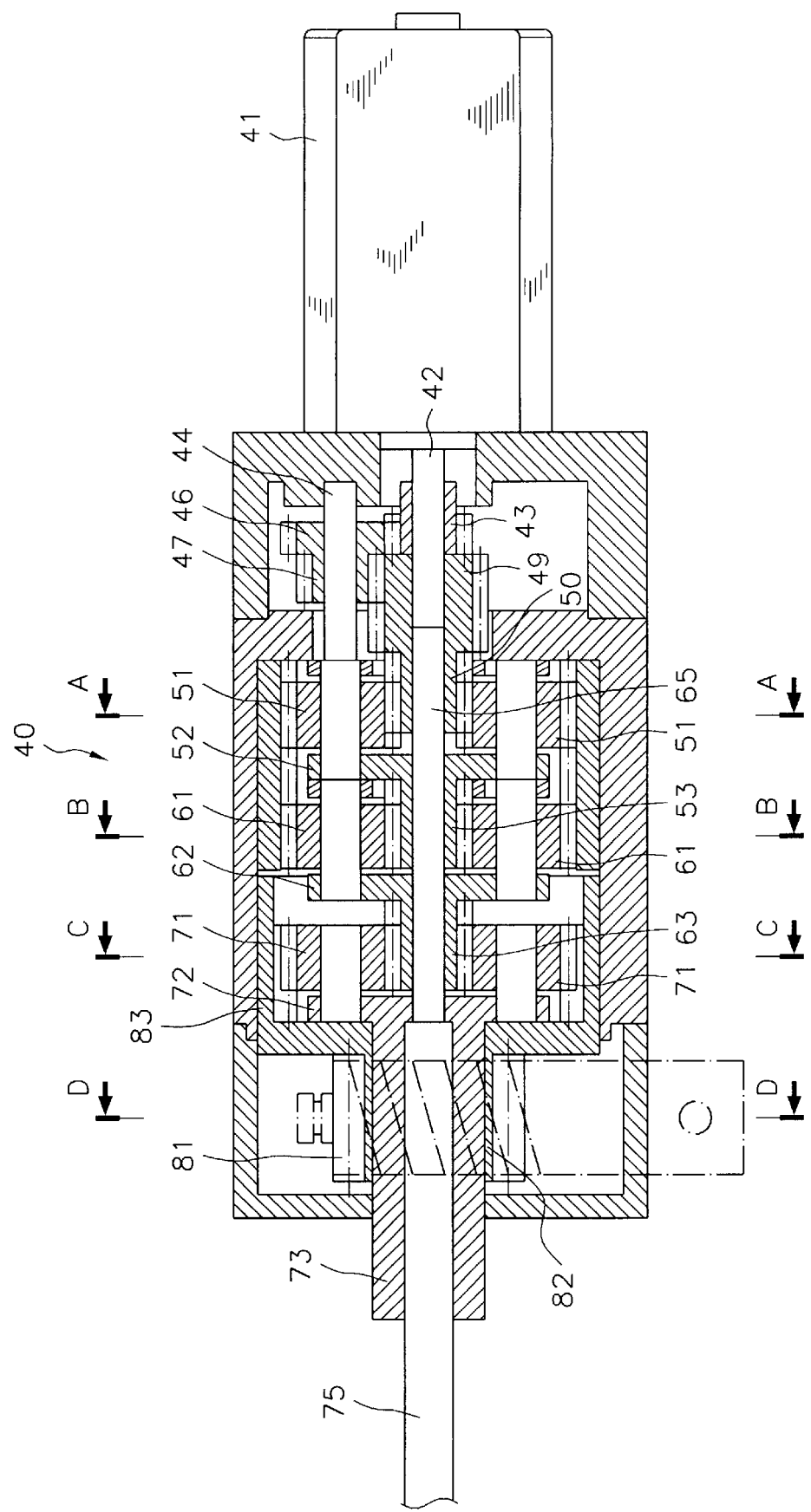
FIG. 3 is a sectional view of an alternate form of the present invention adapted for use in a horizontal blind.
Figure 4:
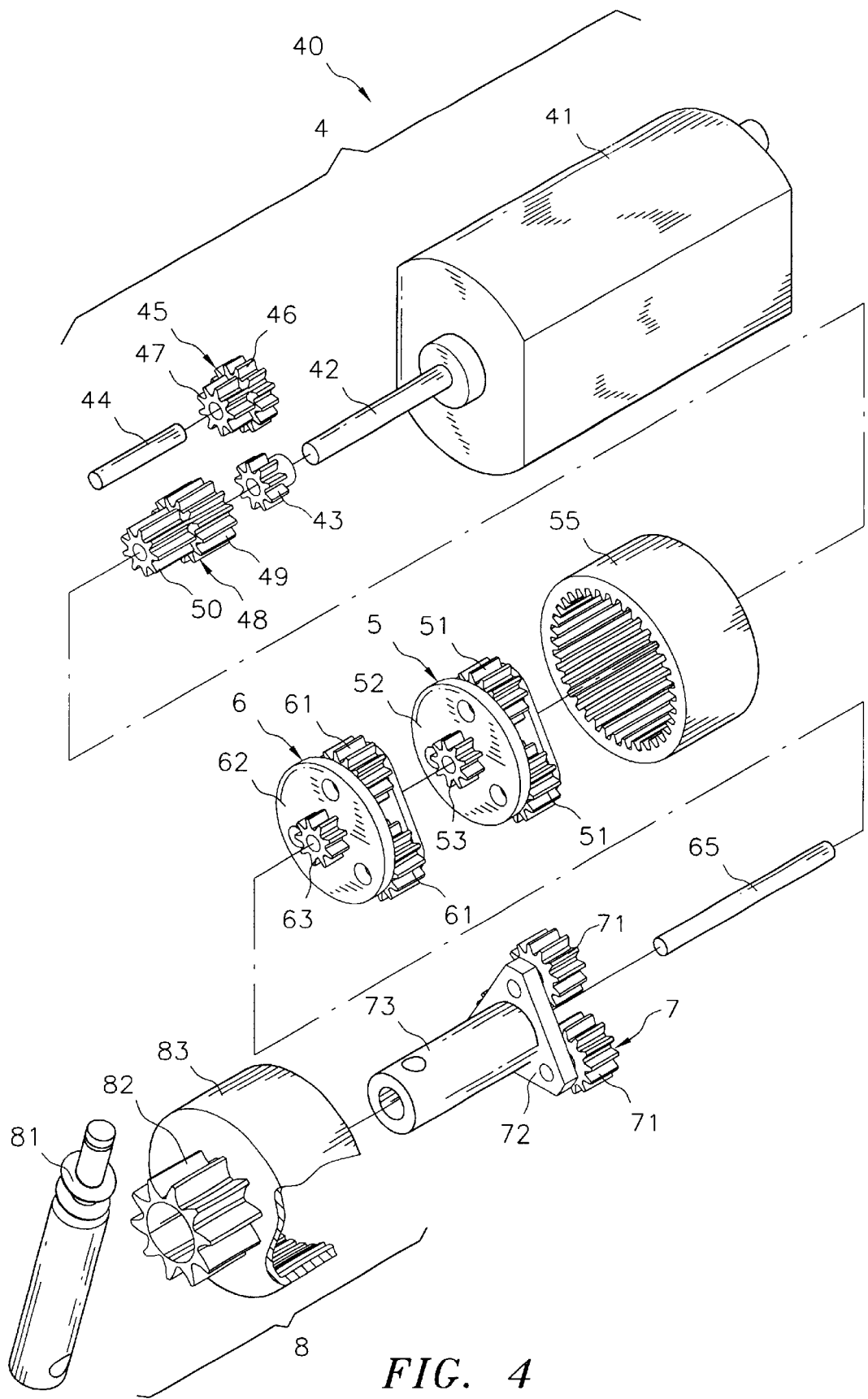
FIG. 4 is an exploded view of the bi-power transmission mechanism shown in FIG. 3.

FIGS. 3 and 4 show an alternate form of the bi-power transmission mechanism. This alternate form of bi-power transmission mechanism 40 is practical for use in a horizontal blind. In order to let the whole bi-power transmission mechanism 40 be inserted into the track of the horizontal blind, spur gear is used instead of worm and worm gear. As illustrated, the first power unit 4 comprises a motor 41, a pinion 43 fixedly mounted on the output shaft 42 of the motor 4, a first combination gear 45 supported on a wheel shaft 44, the combination gear 45 comprising a driven gear 46 meshed with the pinion 43 and a drive gear 47, a second combination gear 48 supported on the output shaft 42 of the motor 41, the second combination gear 48 comprising a driven gear 49 meshed with the drive gear 47 of the first combination gear 45 and a drive gear 50 adapted to rotate a first planetary gear train 5.

Figure 5:
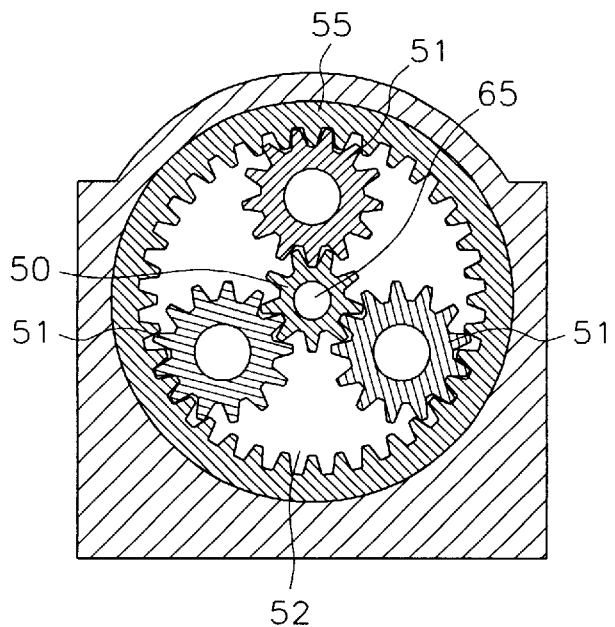
FIG. 5 is a sectional view taken along line A—A of FIG. 3.

Referring to FIG. 5 and FIGS. 3 and 4 again, the first planetary gear train 5 comprises a rack 52, three planet gears 51 equiangularly supported on the rack 52 and respectively meshed with the drive gear 50 of the second combination gear 48, a center gear 53 fixedly mounted on the center of the back side wall of the rack 52 and adapted to rotate a second planetary gear train 6.

Figure 6:
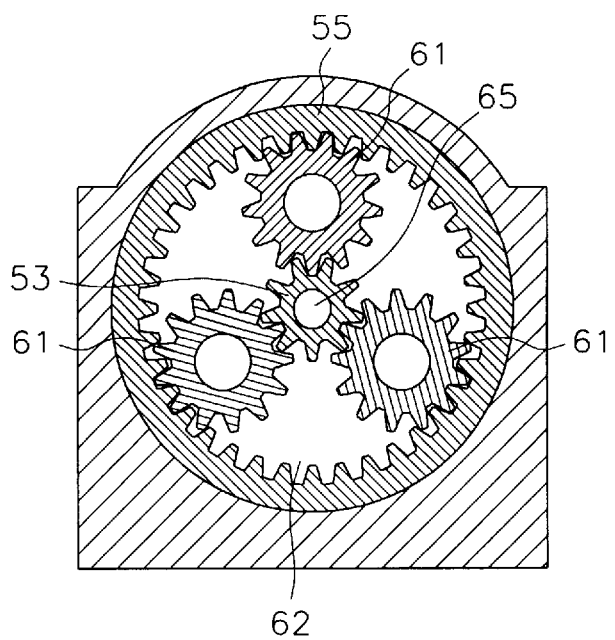
FIG. 6 is a sectional view taken along line B—B of FIG. 3.

Referring to FIG. 6 and FIGS. 3 and 4 again, the second planetary gear train 6 comprises a rack 62, three planet gears 61 equiangularly supported on the rack 62 and respectively meshed with the center gear 53 of the first planetary gear train 5, and a center gear 63 fixedly mounted on the center of the back side wall of the rack 62 and adapted to rotate a third planetary gear train 7.

Figure 7:
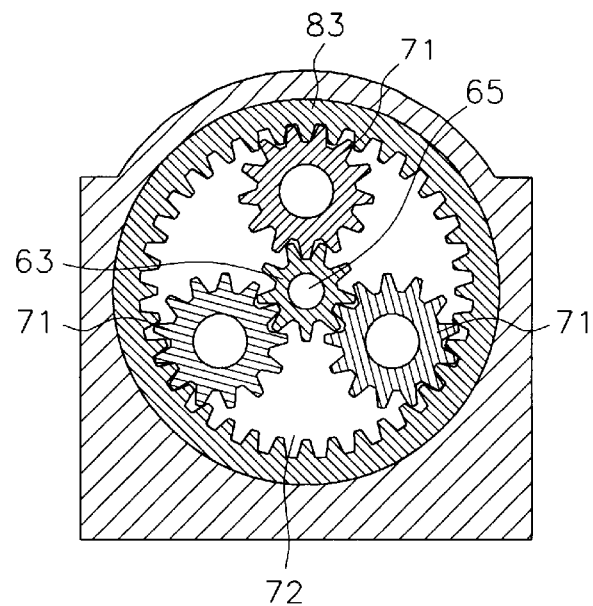
FIG. 7 is a sectional view taken along line C—C of FIG. 3.

Referring to FIG. 7 and FIGS. 3 and 4 again, the third planetary gear train 7 comprises a rack 72, three planet gears 71 equiangularly supported on the rack 72 and respectively meshed with the center gear 63 of the second planetary gear train 6, and an output shaft 73 perpendicularly extended from the back side wall of the rack 72 and coupled to the transmission shaft 75 of the horizontal blind (not shown) for synchronous rotation with the rack 72 to tilt the slats of the horizontal blind.

Referring to FIGS. 3, 5 and 6 again, the planet gears 51 of the first planetary gear train 5 and the planet gears 61 of the second planetary gear train 6 are meshed with an internal gear 55. The center gears 53 and 63 and the output shaft 73 are supported on a common wheel shaft 65.

Figure 8:
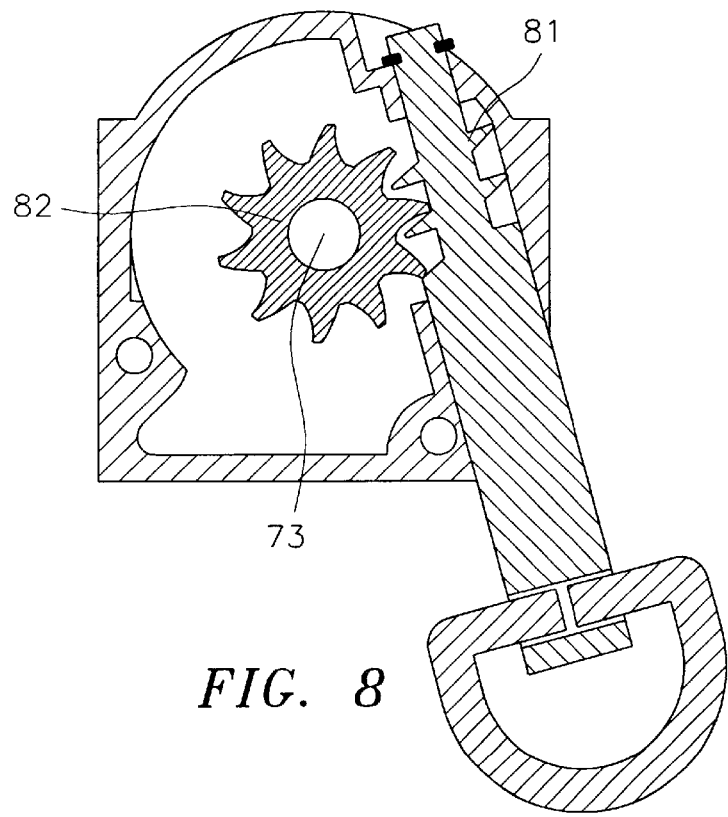
FIG. 8 is a sectional view taken along line D—D of FIG. 3.

Referring to FIG. 8 and FIGS. 3 and 4 again, the second power unit 8 of the bi-power transmission mechanism 40 comprises an internal gear 83 meshed with the planet gears 71 of the third planetary gear train 7, a worm gear 82 fixedly connected to the internal gear 83 and supported with the internal gear 83 on the output shaft 73, and a hand-driven worm 81 meshed with the worm gear 82.

Referring to FIGS. from 3 through 8 again, when starting the motor 41, the rotary output power of the motor 41 is transmitted through the pinion 43 to the first combination gar 45 and the second combination gear 48 to rotate the planet gears 51 of the first planetary gear train 5 and the planet gears 61 of the second planetary gear train 6 and to move the planet gears 51 and 61 along the internal gear 55. At this time, the second power unit 8 does no work, and the internal gear 83 of the second power unit 8 is locked, therefore the planet gears 71 of the third planetary gear train 7 are rotated by the center gear 63 of the second planetary gear train 6 and moved along the internal gear 83 of the second power unit 8, and therefore the output shaft 73 is rotated at a low speed to output a high torque to the transmission shaft 75, causing the transmission shaft 75 to tilt the slats of the horizontal blind.

If the first power unit 4 fails to function well or is prohibited from working due to a particular reason, the worm 81 of the second power unit 8 is rotated with the hand to turn the worm gear 82 and internal gear 83 of the second power unit 8. At this time, the first power unit 4 does no work, and the center gear 63 of the second planetary gear train 6 is locked. Therefore, the planet gears 71 of the third planetary gear train 7 are rotated by the internal gear 83 of the second power unit 8 and moved round the center gear 63 of the second planetary gear train 6, causing the output shaft 73 to rotate at a low speed, and therefore the transmission shaft 75 is driven to tilt the slats of the horizontal blind.

It is to be understood that the drawings are designed for purposes of illustration only, and are not intended for use as a definition of the limits and scope of the invention disclosed.

What the invention claimed is:

1. A bi-power transmission mechanism comprising:
a first power unit, said first power unit comprising a motor having a motor shaft, a worm fixedly mounted on said motor shaft, an input shaft, and a worm gear fixedly mounted on said input shaft and meshed with the worm of said first power unit;
a second power unit, said second power unit comprising a motor having a motor shaft, a worm fixedly mounted on the motor shaft of the motor of said second power unit, a worm gear supported on the input shaft of said first power unit and meshed with the worm of said second power unit and an internal gear fixedly fastened to the worm gear of said second power unit at one side; and
a planetary gear train, said planetary gear train comprising a center gear fixedly fastened to one end of the input shaft of said first power unit for synchronous rotation with said input shaft, a rack, a plurality planet gears equiangularly mounted on said rack and meshed with said center gear, and an output shaft fixedly mounted on said rack.

2. A bi-power transmission mechanism comprising:
a first power unit, said first power unit comprising a motor having a motor shaft, a worm fixedly mounted on said motor shaft, an input shaft, and a worm gear fixedly mounted on said input shaft and meshed with the worm of said first power unit;
a second power unit, said second power unit comprising a hand-driven worm, a worm gear supported on the input shaft of said first power unit and meshed with said hand-driven worm, and an internal gear meshed with gears of a planetary gear train; and
said planetary gear train comprising a center gear fixedly fastened to one end of the input shaft of said first power unit for synchronous rotation with said input shaft, a rack, a plurality planet gears equiangularly mounted on said rack and meshed with said center gear, and an output shaft fixedly mounted on said rack.

3. A bi-power transmission mechanism comprising:
a first power unit, said first power unit comprising a motor having a motor shaft, a pinion fixedly mounted on the motor shaft of the motor of said first power unit, a first combination gear supported on a wheel shaft, said first combination gear comprising a driven gear meshed with said pinion and a drive gear, a second combination gear supported on the motor shaft of the motor of said first power unit, said second combination gear comprising a driven gear meshed with the drive gear of said first combination gear and a drive gear;
a second power unit, said second power unit comprising an internal gear, a worm gear fixedly connected to the internal gear of said second power unit, and a hand-driven worm meshed with said worm gear; and a power output planetary gear train, said power output planetary gear train comprising a wheel shaft, a rack supported on the wheel shaft of said power output planetary gear train, a plurality of planet gears equiangularly supported on the rack of said power output planetary gear train and respectively meshed with the internal gear of said second power unit, and an output shaft fixedly extended from the rack of said power output planetary gear train and supporting the internal gear and the worm gear of said second power unit for enabling the internal gear and the worm gear of said second power unit to be rotated on said output shaft.

4. The bi-power transmission mechanism of claim 3 further comprising a first intermediate planetary gear train, said first intermediate planetary gear train comprising a fixed internal gear, a rack supported on the wheel shaft of said power output planetary gear train, a plurality of planet gears equiangularly supported on the rack of said first planetary gear train and meshed with said fixed internal gear, and a center gear fixedly mounted on the rack of said first intermediate planetary gear train and adapted for turning the planet gears of said power output planetary gear.

5. The bi-power transmission mechanism of claim 4 further comprising a second intermediate planetary gear train coupled between said first intermediate planetary gear train and said power output planetary gear train, said second intermediate planetary gear train comprising a rack supported on the wheel shaft of said power output planetary gear train, a plurality of planet gears equiangularly supported on the rack of said second intermediate planetary gear train and meshed with said fixed internal gear, and a center gear fixedly mounted on the rack of said second intermediate planetary gear train and meshed with the planet gears of said power output planetary gear train.

* * * * *